United States Patent
Vellasques et al.

(10) Patent No.: US 12,530,537 B2
(45) Date of Patent: Jan. 20, 2026

(54) SELF-ATTENTIVE KEY-VALUE EXTRACTION

(71) Applicant: SAP SE, Walldorf (DE)

(72) Inventors: Eduardo Vellasques, Stuttgart (CA); Xiang Yu, Berlin (DE); Stefan Klaus Baur, Heidelberg (DE); Manuel Zeise, Karlsruhe (DE)

(73) Assignee: SAP SE, Walldorf (DE)

( * ) Notice: Subject to any disclaimer, the term of this patent is extended or adjusted under 35 U.S.C. 154(b) by 329 days.

(21) Appl. No.: 18/113,903

(22) Filed: Feb. 24, 2023

(65) Prior Publication Data

US 2024/0289557 A1 Aug. 29, 2024

(51) Int. Cl.
G06F 40/40 (2020.01)
G06F 16/334 (2025.01)
G06F 40/284 (2020.01)

(52) U.S. Cl.
CPC .......... G06F 40/40 (2020.01); G06F 16/3347 (2019.01); G06F 40/284 (2020.01)

(58) Field of Classification Search
CPC ..... G06F 40/40; G06F 16/3347; G06F 40/284
USPC .......................................................... 704/9
See application file for complete search history.

(56) References Cited

U.S. PATENT DOCUMENTS

| | | | | |
|---|---|---|---|---|
| 10,824,808 B2* | 11/2020 | Reisswig | ................ | G06F 40/30 |
| 11,423,093 B2* | 8/2022 | Xiong | ...................... | G06N 3/04 |
| 11,557,283 B2* | 1/2023 | Moritz | .................. | G06N 3/045 |
| 12,013,902 B2* | 6/2024 | Xiong | ..................... | G06F 16/93 |
| 2020/0159828 A1* | 5/2020 | Reisswig | ............... | G06N 3/045 |
| 2021/0089594 A1* | 3/2021 | Xiong | ...................... | G06N 3/08 |
| 2022/0310070 A1* | 9/2022 | Moritz | .................... | G10L 15/28 |
| 2022/0374479 A1* | 11/2022 | Xiong | .................... | G06N 5/022 |
| 2023/0376676 A1* | 11/2023 | Mallinson | ............. | G06F 40/117 |
| 2024/0289557 A1* | 8/2024 | Vellasques | ............. | G06F 40/40 |

FOREIGN PATENT DOCUMENTS

CN 117994671 A * 5/2024

OTHER PUBLICATIONS

Devlin, J. et al., "BERT: Pre-training of Deep Bidirectional Transformers for Language Understanding," arXiv preprint (2018): arXiv:1810.04805.
Luong, M.-T. et al., "Effective Approaches to Attention-based Neural Machine Translation," arXiv preprint (2015): arXiv:1508.04025.
Vaswani, A. et al., "Attention Is All You Need," arXiv preprint (2017): arxiv:1706.03762.

* cited by examiner

Primary Examiner — Edwin S Leland, III
(74) Attorney, Agent, or Firm — Mintz Levin Cohn Ferris Glovsky and Popeo, P.C.

(57) ABSTRACT

Systems and methods are provided for automated identification of key-value pairs in documents. A document including readable text is received. The document is processed to determine, from the readable text, a plurality of tokens. Pairs of vectors corresponding to the plurality of tokens are determined, each pair of vectors comprising a query vector and a key vector. Attention scores are determined for the plurality of tokens by using the pairs of vectors. The attention scores are normalized to generate normalized attention scores. Connected tokens are identified in the plurality of tokens using the normalized attention scores.

17 Claims, 5 Drawing Sheets

200

| ENTITY LOGO 212 |
| --- |

| ENTITY DATA 210 |
| --- |

202
214 → INVOICE NUMBER: DE-RE-2023-3454743 ← 212A
216 → INVOICE DATE FEBRUARY 25, 2023 ← 212B

206 → | VENDOR NAME |
       | ADDRESS    |

204

INVOICE 208

| ITEM IDENTIFIER 218A | QUANTITY 218B | UNITS 218C | DESCRIPTION 218D | RATE 218E |
| --- | --- | --- | --- | --- |
| 1 NHB ← 220A | 3 ← 220D | 1 ← 220G | 1 MATERIAL DETECTOR ← 220J | 7,850 ← 220M |
| 2 VNJ ← 220B | 2 ← 220E | 5 ← 220H | 2 DETECTION SOLUTION ← 220K | 2,968 ← 220N |
| 3 GNY ← 220C | 9 ← 220F | 3 ← 220I | 3 SAMPLES ← 220L | 3,875 ← 220O |

222 → TOTAL 14,693

*FIG. 2A*

SELF-ATTENTIVE KEY-VALUE EXTRACTION

TECHNICAL FIELD

The subject matter described herein relates generally to document processing and more specifically to document processing for key-value extraction.

BACKGROUND

Traditionally, during the development process of neural network-based extraction models, large volumes of data is manually annotated for training the models. The manual annotation of documents can be a labor-intensive process, where human labelers annotate each word in each document (in a training dataset comprising thousands of pages) with a label for the fields to be extracted (such as delivery date, purchase order number, etc.). The sets of labels from different document types usually present small overlaps, such that the annotation schema used in enterprise applications of document information extraction is specific to the document type. Within a given document type, the label set can be constantly evolving, and the annotation may in addition include the annotation of relations between certain labels (key-value pairs). Adding new fields or supporting new document types requires annotating thousands of documents with the newly added labels for maintaining the usability of the models.

SUMMARY

Systems, methods, and articles of manufacture, including computer program products, are provided for multi-language document field extraction. In one aspect, there is provided a system including at least one data processor and at least one memory. The at least one memory may store instructions that cause operations when executed by the at least one data processor. The operations may include: receiving, by one or more processors, a document including readable text; processing, by the one or more processors, the document to determine, from the readable text, a plurality of tokens; determining, by the one or more processors, pairs of vectors corresponding to the plurality of tokens, each pair of vectors including a query vector and a key vector; determining, by the one or more processors, attention scores for the plurality of tokens by using the pairs of vectors; normalizing, by the one or more processors, the attention scores to generate normalized attention scores; and identifying, by the one or more processors, connected tokens in the plurality of tokens using the normalized attention scores.

In another aspect, there is provided a method for multi-language document field extraction. In some implementations, the computer-implemented method further includes transmitting, to a database, the connected tokens for storage, the database being accessible by the application for processing the connected tokens. In some implementations, the document is formatted as an image. In some implementations, the computer-implemented method further includes: processing the image, using an optical character recognition application, to generate the readable text. In some implementations, the readable text includes keys and values. In some implementations, the vectors include key vectors and query vectors. In some implementations, the normalized attention scores include instance scores and key-value scores.

In another aspect, there is provided a computer program product that includes a non-transitory computer readable storage medium. The non-transitory computer-readable storage medium may include program code that causes operations when executed by at least one data processor. The operations may include: receiving a document including readable text; processing the document to determine, from the readable text, a plurality of tokens; determining pairs of vectors corresponding to the plurality of tokens, each pair of vectors including a query vector and a key vector; determining attention scores for the plurality of tokens by using the pairs of vectors; normalizing the attention scores to generate normalized attention scores; and identifying connected tokens in the plurality of tokens using the normalized attention scores.

In some variations of the non-transitory computer readable media, one or more of the following features can optionally be included in any feasible combination. In some implementations, the operations further include: transmitting, to a database, the connected tokens for storage, the database being accessible by the application for processing the connected tokens. In some implementations, the document is formatted as an image. In some implementations, the operations further include: processing the image, using an optical character recognition application, to generate the readable text. In some implementations, the readable text includes keys and values. In some implementations, the vectors include key vectors and query vectors. In some implementations, the normalized attention scores include instance scores and key-value scores.

In another aspect, a system includes: at least one data processor; and at least one memory storing instructions, which when executed by the at least one data processor, cause operations including: receiving a document including readable text; processing the document to determine, from the readable text, a plurality of tokens; determining pairs of vectors corresponding to the plurality of tokens, each pair of vectors including a query vector and a key vector; determining attention scores for the plurality of tokens by using the pairs of vectors; normalizing the attention scores to generate normalized attention scores; and identifying connected tokens in the plurality of tokens using the normalized attention scores.

In some variations of the system, one or more of the following features can optionally be included in any feasible combination. In some implementations, the operations further include: transmitting, to a database, the connected tokens for storage, the database being accessible by the application for processing the connected tokens. In some implementations, the document is formatted as an image. In some implementations, the operations further include: processing the image, using an optical character recognition application, to generate the readable text. In some implementations, the readable text includes keys and values. In some implementations, the vectors include key vectors and query vectors. In some implementations, the normalized attention scores include instance scores and key-value scores.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to multi-language document field extraction, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2A illustrates an example document, in accordance with some example implementations;

When practical, similar reference numbers denote similar structures, features, or elements.

DETAILED DESCRIPTION

Figure 1:
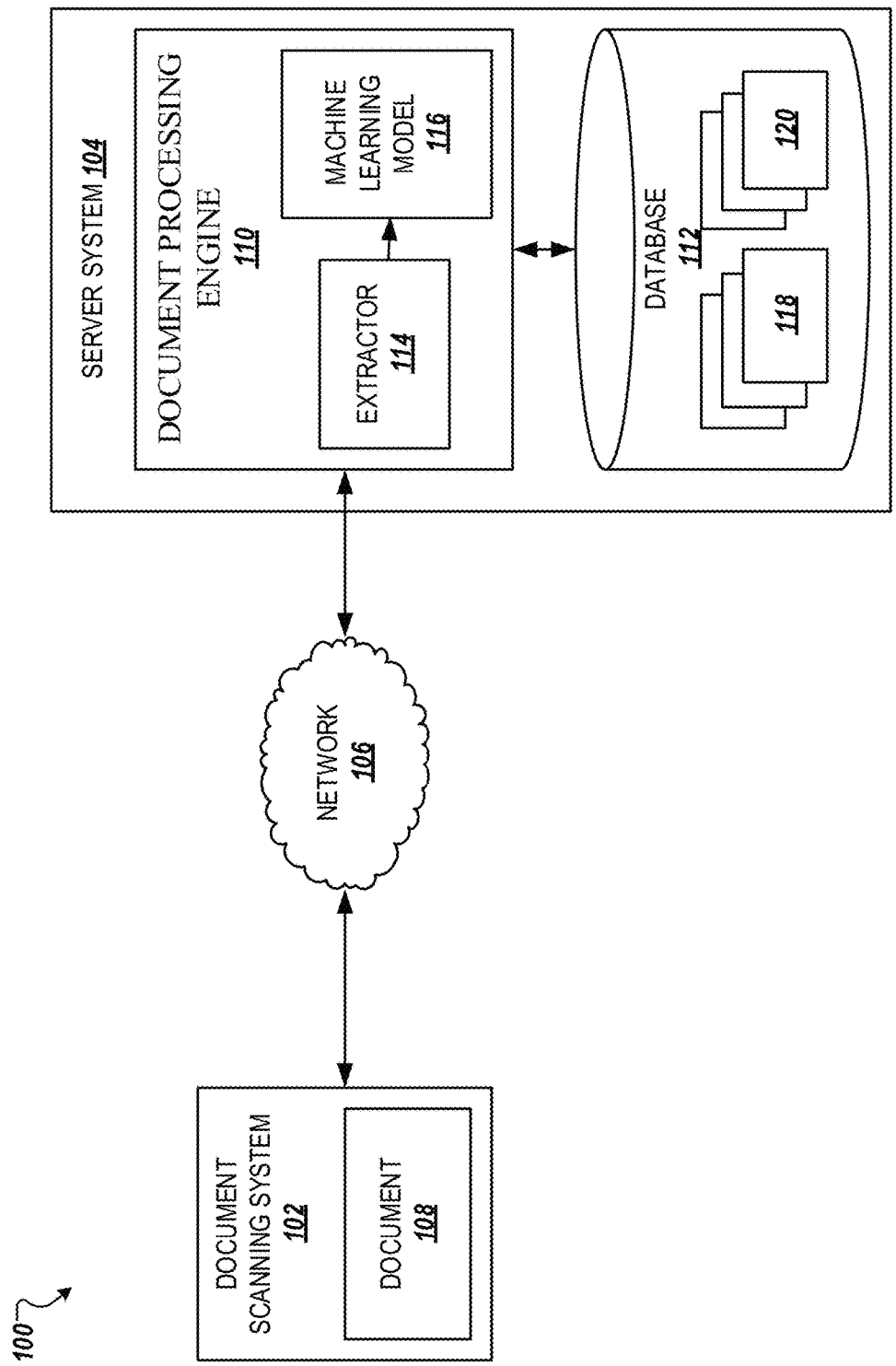
FIG. 1 illustrates an example of a system diagram, in accordance with some example implementations.

The disclosed subject matter relates to automated extraction of document features (logical entities) from scanned documents (e.g., medical documents, purchasing documents, passports, identification cards) using a software application, such as a web-based service. The document features may be used as an input for one or more applications, the accuracy of the output of such applications depending on the quality of the document feature extraction.

Scanned documents can be processed with an optical character recognition (OCR) solution to generate readable documents. Document features can be extracted, from the readable documents, based on the image and/or the text information included in the documents. The document feature extraction can be performed using machine learning models, such as neural network-based extraction models. Neural network-based models deployed in the software application are document-specific, global models that can be trained using a large corpus of manually annotated documents of the same document type. The annotations may include labels identifying the fields of the documents and identifiers of the relations between labels (key-value pairs). As a result, the quality and accuracy in determining the meaning of values within a document, extracting such values, and categorizing such values suffers and is dependent on the availability of a large quantity of training documents in multiple formats and/or languages. As a result, machine learning models may generally inaccurately extract information from documents in formats or languages that do not appear frequently. Adding new fields or supporting new document types requires annotating thousands of documents with the newly added labels, making the maintenance of such models very difficult.

To overcome the above deficiencies of feature extraction from scanned documents, computer-implemented systems and methods are provided, in accordance with one or more embodiments, for automatically extracting key-value pairs in a generic way from scanned documents. In particular, automatic extraction of key-value pairs can include mapping pairs of word tokens to vectors, determining an attention score of the word tokens based on their vectors, normalizing the attention score to generate a normalized attention score; and identifying connected word tokens using the normalized attention score. The implementations described in the current disclosure enables automatic extraction of key-value pairs that is more computationally efficient, minimizing memory requirements. As another advantage of some implementations of the described technology, adjacency matrices (word networks) can be predicted for a given document. The adjacency matrices can provide redundant information (e.g., even if one word link is missing, being able to detect others within an instance or across different instances enables a positive detection) and optimize use of computational resources (allowing training of larger amounts of data). As a separate application, the described technology allows for grouping of word tokens that belong to the same instance.

FIG. 1 illustrates an example of a system 100, in accordance with some example implementations. The example system 100 can include a document scanning system 102, a server system 104, and a network 106.

The document scanning system 102 can be a processor-based device including, for example, a printer with scanner, a scanner, a smartphone, a tablet computer, a wearable apparatus, a virtual assistant, an Internet-of-Things (IoT) appliance, and/or the like. The document scanning system 102 can include an optical scanner configured to generate images of the front and back of documents 108 or a user device including a camera that can generate images of documents 108. The documents 108 may include medical documents, legal documents, purchasing documents (e.g., invoices, purchase orders, order confirmations, payment confirmations), identification cards, and/or the like. The documents 108 may be associated with a particular sender or vendor such that the one or more documents 108 received from the particular sender or vendor have a document layout and/or are associated with different document types. For example, the one or more documents 108 may be associated with a particular transaction such that the one or more documents 108 associated with the particular transaction and vendor. Additionally and/or alternatively, the documents 108 may include one or more languages, such as languages from different countries (e.g., countries in which the documents originated, the country of origin of the transaction associated with the document, the country associated with the vendor or sender, and/or the like).

The document scanning system 102 can interact with the server system 104 to transmit the images of the scanned documents 108 over the network 106. It should be appreciated that the network 106 can be any wired and/or wireless network including, for example, a public land mobile network (PLMN), a local area network (LAN), a wide area network (WAN), the Internet, a cellular network, a telephone network (e.g., PSTN) or an appropriate combination thereof connecting any number of communication devices, mobile computing devices, fixed computing devices, server systems, and/or the like.

The server system 104 can include a distributed data processing system. In some implementations, the server system 104 and/or any of its components can be incorporated and/or part of a container system that can be used in cloud implementations. The server system 104 can include any form of servers including, but not limited to a web server (e.g., cloud-based server), an application server, a proxy server, a network server, and/or a server pool. In general, the server system 104 can accept requests to execute services that enable processing of documents 108. The server system 104 can include a document processing engine 110 and a database 112.

The document processing engine 110 may include hardware or software implementations (e.g., applications or software objects instantiated over one or more computing systems) that may process documents 108 received, to generate one or more triggering background jobs, either independently or in association with the document scanning system 102. Depending on implementation, the collected background job data may be clustered or categorized into different groups in association with different attributes (e.g., data source, priority, sensitivity, quality, quantity, urgency, context or other factors) that may identify certain background job data as more important or interesting for the purpose of detecting a triggering background job, for example. In some implementations, different categories and groups of background job data may be collected, identified, stored or streamed as belonging to different background job types. The document processing engine 110 may include one or more models 116 (including machine learning models or other models) for processing a document 108 based on an identified field type. For example, the document processing engine 110 may include an extractor 114, the model 116, and/or the like for processing one or more documents 108, as described herein.

The document processing engine 110 can automatically determine and assign a field type to a key-value pair within a document 108, such as a document 108 received from the document scanning system 102, regardless of the format and/or language used in the document 108. For example, the extractor 114 may extract or otherwise identify one or more key fields and one or more value fields corresponding to the one or more key fields from within the document. The extractor 114 identifies the one or more key fields and the one or more value fields regardless of the key field type. The document processing engine 110 can use the extractor 114 to identify connected word tokens using an attention score based on a mapping between word tokens and vectors. The mapping can be stored in the database 112 as vector correspondence tables corresponding to particular document type layout 120. For example, the document processing engine 110 can using two models 116 that can map a pair of vectors (from a word pair) to a pair of vectors. The document processing engine 110 can use the mapped pair to compute an attention score that can be normalized to have a value in a range between 0 and 1. The document processing engine 110 can use a gradient descent to learn the parameters of the model 116 (based on a binary cross entropy loss, a parameter optimization algorithm such as gradient descent, a loss function such as binary cross-entropy loss, hinge loss or any other loss function types) for identifying connected tokens (tokens belonging to an entity or tokens belonging to a key-value pair) that can be stored by the database 112 for use by other applications available through the server system 104.

The database 112 can be any type of database including, for example, an in-memory database, a relational database, a non-SQL (NoSQL) database, and/or the like. As shown in FIG. 1, the database 112 can be a dedicated, single-container database system running a single instance of the document processing engine 110. However, where the database 112 implements a multitenant database architecture (e.g., multitenant database containers (MDC)), each tenant of the database 112 can be served by separate instances of the document processing engine 110. In some implementations, the database 112 stores identified data (connected tokens) 118 generated by the document processing engine 110 after processing documents 108 and also stores predefined layouts 120 used, by the document processing engine 110, for processing the documents 108. The database 112 may transmit the identified data (connected tokens) 118 to other applications hosted by the server system 104 and, optionally, to the document scanning system 102. Further details about the functions of the server system 104, the document processing engine 110, and the database 112, are described with reference to FIG. 3.

FIG. 2A illustrates an example document 200 (e.g., document 108 described with reference to FIG. 1) that may be generated by a document scanning system (e.g., document scanning system 102 described with reference to FIG. 1) and/or received by a server system (e.g., server system 104 described with reference to FIG. 1), in accordance with some example implementations. The document 200 can include multiple document features including tokens (e.g., a readable text, such as a string of numbers, letters, and/or special characters) and images. The tokens can be included in one or more fields, such as document header 202, entries of one or more tables 204, vendor information 206, a document type identifier 208, entity data 210 and/or other document features. The tokens can include keys and corresponding values. A key (e.g., "invoice number" 214) can include a name of a field (identifying the data type) and value (e.g., "DE-RE-2023-3454743" 212A) can include an actual data corresponding to the key. The images can include one or more logos 212 (e.g., a logo of the sender or vendor associated with the document 200).

The keys including one or more document header fields 202 may include text associated with a particular position within the document 200. For example, the one or more document header fields 202 may generally be positioned at or near a (left or right) top section of the document 200. The one or more document header fields 202 may additionally and/or alternatively be positioned at other locations within the document 200 such as below a table, and/or the like. In some implementations, the one or more document header fields 202 may each be positioned at and/or associated with a particular spatial position within the document 200. The keys including the document header fields 202 may include a document number 214, a date 216, a tax identification number, and/or the like. The vendor information 206 can include a name and an address. The key including the document type identifier 208 can include a standard name of the document type (e.g., invoice, driving license, passport, etc.). The entity data 210 can include contact data, such as an e-mail address and/or a website. Documents including a similar layout as the document 200 would include the same document header fields 202, the same vendor information 206, the same document type identifier 208, and/or the same or similar spatial positions of the document header fields 202, of the vendor information 206, and of the document type identifier 208. The document 200 may include one or more values (e.g., alphabetic, numeric, alphanumeric, etc.) associated with each of the one or more keys including the document header 202, entries of one or more tables 204, vendor information 206, a document type identifier 208, and entity data 210.

The table 204 can include one or more keys (table header fields 218A-E) that may include text associated with a header of a column in the table 204 included in the document 200. The one or more table header fields 218A-E may be associated with a particular value and/or a particular position within the table and/or the document 200. For example, each of the one or more table header fields 218A-E may be associated with a particular column of the table including a set of values, such that documents having a similar layout as the document 200 would include the same key table header fields 218A-E and/or the table header fields 218A-E in the same or similar spatial position. As an example, the keys table header fields 218A-E can include an item identifier, a quantity, a number of units, a description of an item, a rate, and/or the like. Each key (table header fields 218A-E) has a set of values (columns of the table 204) that include a set of listed data 220A-O.

The key-value pairs (including a key and a corresponding value) including the vendor information 206 may be associated with the vendor or sender of the document 200. The vendor information 206 may be associated with a recipient of the document 200. The vendor information 206 may include a name, address, geographic location, telephone number, and/or the like associated with the vendor or sender of the document 200. The key-values including vendor information 206 may be associated with a particular spatial position within the document 200. Other documents having the same layout as the document 200 would include vendor information in the same or similar spatial position as the vendor information 206 shown in the document 200. In some implementations, the key (e.g., "vendor information") can be missing, but the corresponding values (actual name and/or address of a vendor) can be included.

With continued reference to FIG. 2A, the one or more document features of the document 200 may include one or more logos 212. The one or more logos 212 may be associated with an entity, such as an issuing entity, a document author, a sender, a vendor, and/or the like. The one or more logos 212 may include an image and/or text. The one or more logos 212 may be associated with a particular spatial position within the document 200. As an example, in the document 200, the logo 212 is positioned in the upper left corner of the document 200. In this example, other documents having the same layout as the document 200 would include a logo in the same or similar spatial position as the logo 212 shown in the document 200.

Figure 2B:
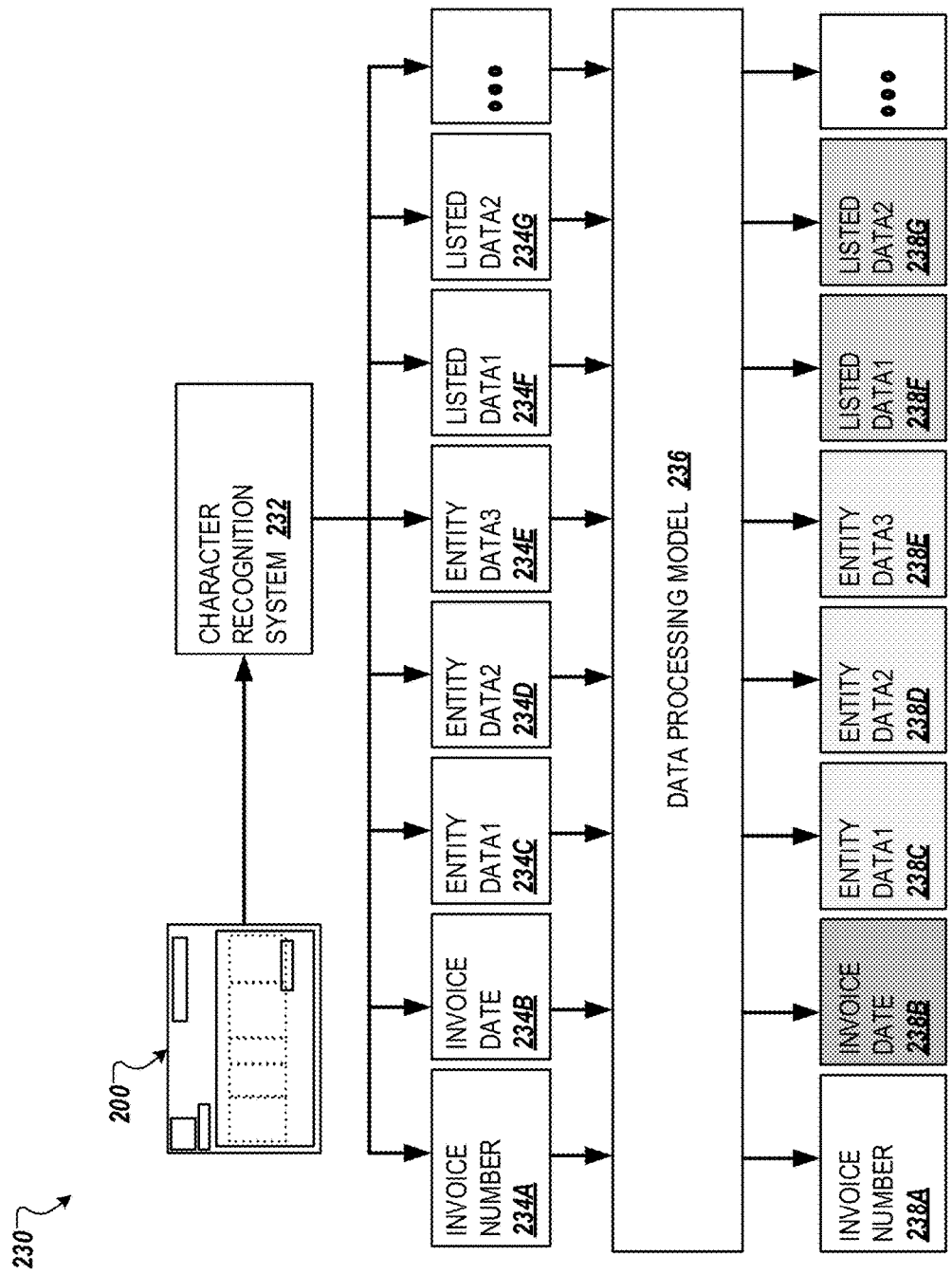
FIG. 2B illustrates an example document information extraction architecture, in accordance with some example implementations.

FIG. 2B illustrates an example document information extraction architecture 230, in accordance with some example implementations. The example document 200 (e.g., document 108 described with reference to FIG. 1) can be processed by a character recognition system 232 integrated in a document scanning system (e.g., document scanning system 102 described with reference to FIG. 1) and/or a server system (e.g., server system 104 described with reference to FIG. 1). The character recognition system 232 can generate a readable document that can be processed, by an extractor (e.g., extractor 114 described with reference to FIG. 1) of a document processing engine (e.g., document processing engine 110 described with reference to FIG. 1) to extract the fields 234A-234G of the document 200. The fields 234A-234G can include a document header, entries of one or more tables, vendor information, a document type 208, entity data and other fields, as described with reference to FIG. 2A. Each of the fields 234A-234G can be associated with a document location. Each of the fields 234A-234G can include one or more values (e.g., alphabetic, numeric, alphanumeric, etc.). The fields 234A-234G can be processed by a data processing model 236 (e.g., model 116 described with reference to FIG. 1) to automatically assign labels indicating classes corresponding to the fields. The classification of the field 238A-238G can include an assignment of a categorical label for each field in the document 200.

Figure 3:
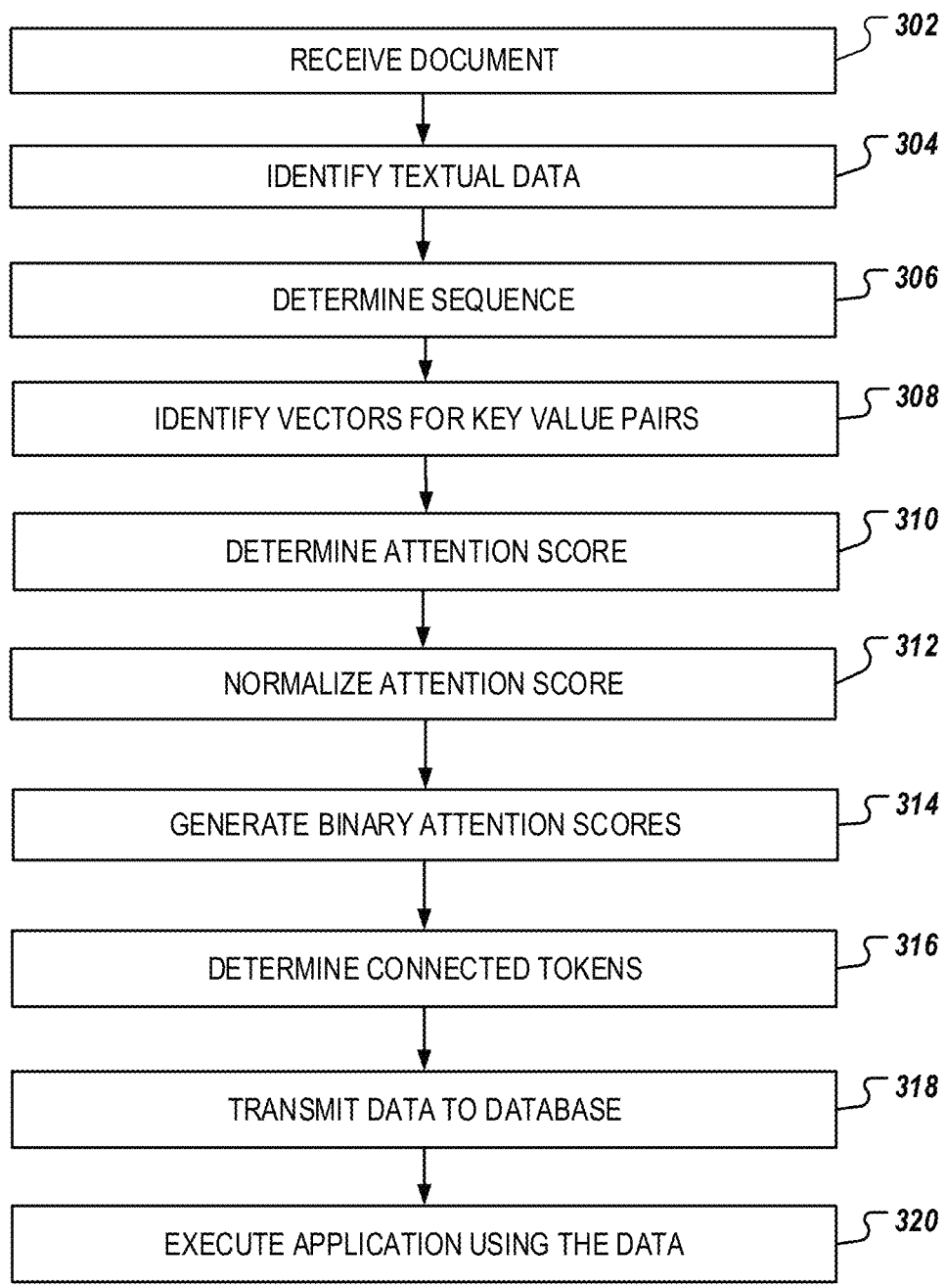
FIG. 3 illustrates an example process, in accordance with some example implementations.

FIG. 3 depicts a flowchart illustrating an example process 300 for automated extraction of document features from scanned documents, in accordance with some example implementations. The process 300 can be executed by the system 100 shown in FIG. 1, using the example architecture 200 shown in FIG. 2B, the system 400 shown in FIG. 4 or any combination thereof.

At 302, a document is received. For example, the document can be received from a document scanning system or a user device by a document processing engine (as described with reference to FIG. 1). The document can be a scanned document including, for example, the document 200 described with reference to FIGS. 2A and 2B. The received document can be formatted as an image or other type of document.

At 304, the document can be converted, by the document processing engine, to a readable format. For example, the scanned document can be processed by the document processing engine using an optical character recognition application, to generate a readable document. The readable document can include textual data, image data, and, optionally, spatial information associated with the textual data and the image data. The textual data includes multiple tokens including keys and corresponding values. The key includes a string (letters and/or numbers) defining a name of a data type included in a document field. The value includes a string (letters and/or numbers) defining a value of the data of a corresponding data type included in a document field. The document is considered "readable" in the sense that the data is formatted as processable strings including letters and numbers. In some implementations, the readable document can be processed to identify a document layout. For example, the document processing engine can process a portion of the textual data (e.g., header or name) of the readable document and can use a name of an author of the document to identify a document type. In some implementations, the spatial information corresponding to each of the tokens can be identified. For example, the document processing engine can process the textual data relative to the matching template layout of the readable document to determine the spatial information for each token, the spatial information including a location of a token (word) relative to a template. In some implementations, at least some fields may belong to a document layout, but are not considered to be a mandatory field. For example, the readable document with an identified layout can miss a particular token (e.g., key), such as a purchase order number. The spatial information can be used to add a generic key for the identified missing token.

At 306, the readable document can be processed, by the document processing engine, to generate a sequence of tokens (words that could be separated by bounding boxes) each associated with a corresponding spatial information. In some implementations, the tokens can be arranged within the sequence based on the corresponding spatial information, such that tokens expected to be associated with each other (possibly forming a key-value pair or an instance) can be grouped within the sequence.

At 308, vectors are identified for each token in the sequence of tokens. The vectors can include a representation of the meaning of a token (word) in the sequence of tokens. The vectors can include a key vector and a query vector. An entity can include a group of words (multiple tokens) that are semantically related. For example, a key called "invoice number" includes two constituent words "invoice" and "number", which are considered as forming an entity (e.g., a key entity). The complex key (e.g., "invoice number") including multiple constituent words, can have a value including a string (a composition of numbers and/or letters). The vectors can be obtained, for example, from a vector correspondence table (where each word has a corresponding vector) that can be retrieved from the database. In some implementations, each document type has a respective vector correspondence table, which can be retrieved based on a document type identifier. In some implementations, the query vectors and the key vectors can be generated by a neural network (e.g., a fully connected neural network). That is, given an embedding model E(w), that maps word w of the sequence of tokens ($w_1 \ldots w_n$) to a vector representation h, two models Q(h) and K(h) are generated to map a pair of vectors ($h_i$, $h_j$) (from a word pair ($w_i$, $w_j$)) to a key-query pair ($q_i$, $k_j$), where $q_i$ is a vector representation for word $w_i$ and $k_j$ is the vector representation for word $w_j$. In some implementations, the two models Q(h) and K(h) can be identical.

At 310, an attention score is determined for each word pair of the sequence of tokens, using the generated vectors. The attention score can include a ranking defining an importance level of a given token with respect to the importance level of another token. The attention score can be determined by mapping a pair of vectors ($h_i$, $h_j$) (from a word pair ($w_i$, $w_j$)) to a key-query pair ($q_i$, $k_j$). The attention score can be computed as a weighted sum of the key vectors. The weights can be computed by many different techniques, including using the elements of the query vectors as weights (leading to the dot-product attention). For example, the attention score for each word pair can be determined as a product between the transposed query vector $q_i^T$ of a first word $w_i$ of the two words in the respective word pair ($w_i$, $w_j$) and the key vector $k_j$ of the second word ($w_j$) of the two words in the respective word pair:

$$\text{Attention}_{(i,j)} = q_i^T k_j$$

At 312, a normalized attention score is generated for each word pair of the sequence of tokens, by processing the attention score. For example, the attention score can be normalized by applying a sigmoid function ($\sigma(x)$) to convert the values of $\text{Attention}_{(i,j)}$ to be included in a range between 0 and 1:

$$QK(h_i, h_j) = \sigma(Q(h_i)^T K(h_j))$$

In some implementations, the normalized attention scores include instance scores and key-value scores that can be generated using two models: $QK_{inst}(h_i, h_j)$ to predict links between words belonging to a same instance (e.g., a group of words forming a specific key in the document) and $QK_{KV}(h_i, h_j)$ to predict links between words belonging to a key-value pair. The two models can be learned jointly using sets of annotated documents of different types or public datasets featuring similar information. During inference, the model outputs can be used to detect word tokens forming an instance by finding connected components in the output of the instance scores $QK_{inst}(h_i, h_j)$. The normalized attention score including the instance scores can indicate the links between words belonging to a same instance can detect all the instances for a given document. Words that belong to the same instance are grouped (e.g., multiple word boxes maybe in two subsequent word lines). Link prediction excludes connections between instances at different places in the documents. For example, if a document includes twice "DE 1223" (with two tokens "DE" and "1223") as IBAN, the instance grouping can merge them separately into two instances without connecting the first "DE" with the second "DE" Identified (two or more) instances can be connected if there is at least one key-value link between them (e.g., one word in a first instance can be connected to one word in a second instance) using the normalized attention score of $QK_{KV}(h_i, h_j)$ predicting links between words belonging to a key-value pair. The training data for each document can contain two N×N matrices (with binary elements): one for the instance-level word connections and another one for the key-value word connections, where N corresponds to the number of tokens a given document in the training dataset. Such type of matrix is also known as a word adjacency matrix. For example, for an entry like:

| Purchase Order No | ABC.1234 |
| --- | --- |

Annotations can include separate keys to the "Purchase Order No" (e.g., PurchaseOrder.Key) and "ABC.1234" (e.g., PurchaseOrder. Value), and a bounding box around each of these. For the provided example, the instance-level reference adjacency matrix can contain a "1" in positions (Pos(Purchase), Pos(Order)), (Pos(Purchase), Pos(No)) and (Pos(Order), Pos(No)) where Pos(w) is the position of word w in the document. The key-value adjacency matrix would contain a "1" in positions (Pos(Purchase), Pos(ABC. 1234)), (Pos(Order), Pos(ABC.1234)) and (Pos(Order), Pos (ABC.1234)). As some datasets may not include all positive cases (e.g., annotations for all key-value pairs), but only for a subset, the model training process can be adapted to take this into account (e.g. by using a student-teacher approach or a negative sampling heuristic), making the process applicable to documents that have only incomplete, partial annotations, without requiring extensive, costly re-annotations of all instances and key-value pairs on all training documents.

The instance-level word connections can be automatically obtained from annotations typically used in label-based document information extraction that can include a bounding box information for words belonging to a same instance. Referring again to the presented example, such type of annotation can result in a bounding box around "Purchase Order No" and another bounding box around "ABC.1234". Annotations of documents can include identifiers of word "relatedness" (in this case "No" and "ABC.1234", for example) that are used to determine key-value connections.

At 314, the normalized attention scores can be converted to binary attention scores. The binary attention scores can be generated by comparing normalized attention scores to a threshold or by using a threshold function. For example, the normalized attention scores above the threshold (e.g., 0.5) can be assigned binary attention scores of 1, indicative of connected tokens corresponding to a key-value pair or the same instance, and the normalized attention scores below the threshold (e.g., 0.5) can be assigned binary attention scores of 0. As another example, the normalized attention scores can be processed using a threshold function t(x), for example:

$$t(x) = \begin{cases} 0, & x \le 0.5 \\ 1, & x > 0.5 \end{cases}$$

At 316, connected tokens corresponding to a key-value pair or to the same instance are identified. The binary attention scores (e.g., binary attention scores of 1) corresponding to the normalized attention scores exceeding the threshold can be used to indicate connected tokens corresponding to key-value pairs, where one key can correspond to multiple values.

At 318, data including identified key-value pairs and identified instances is transmitted for storage to a database, making it accessible for one or more applications.

At 320, the identified key-value pairs and identified instances are provided as input for an application. The example process 300 enables optimized processing of documents to more efficiently and/or accurately automatically identify key-values pairs and instances included in the received document, enabling document processing by one or more applications. For example, the keys of extracted key-value pairs can be mapped to entities by applying a look-up using a list of key words, by evaluating a semantic embeddings or by using named entity recognition models. The example process 300 can save time in labeling process by pre-annotating key-value pair relations. Grouping of words into instances, as performed in the example process 300 can help to avoid traditional heuristics.

Figure 4:
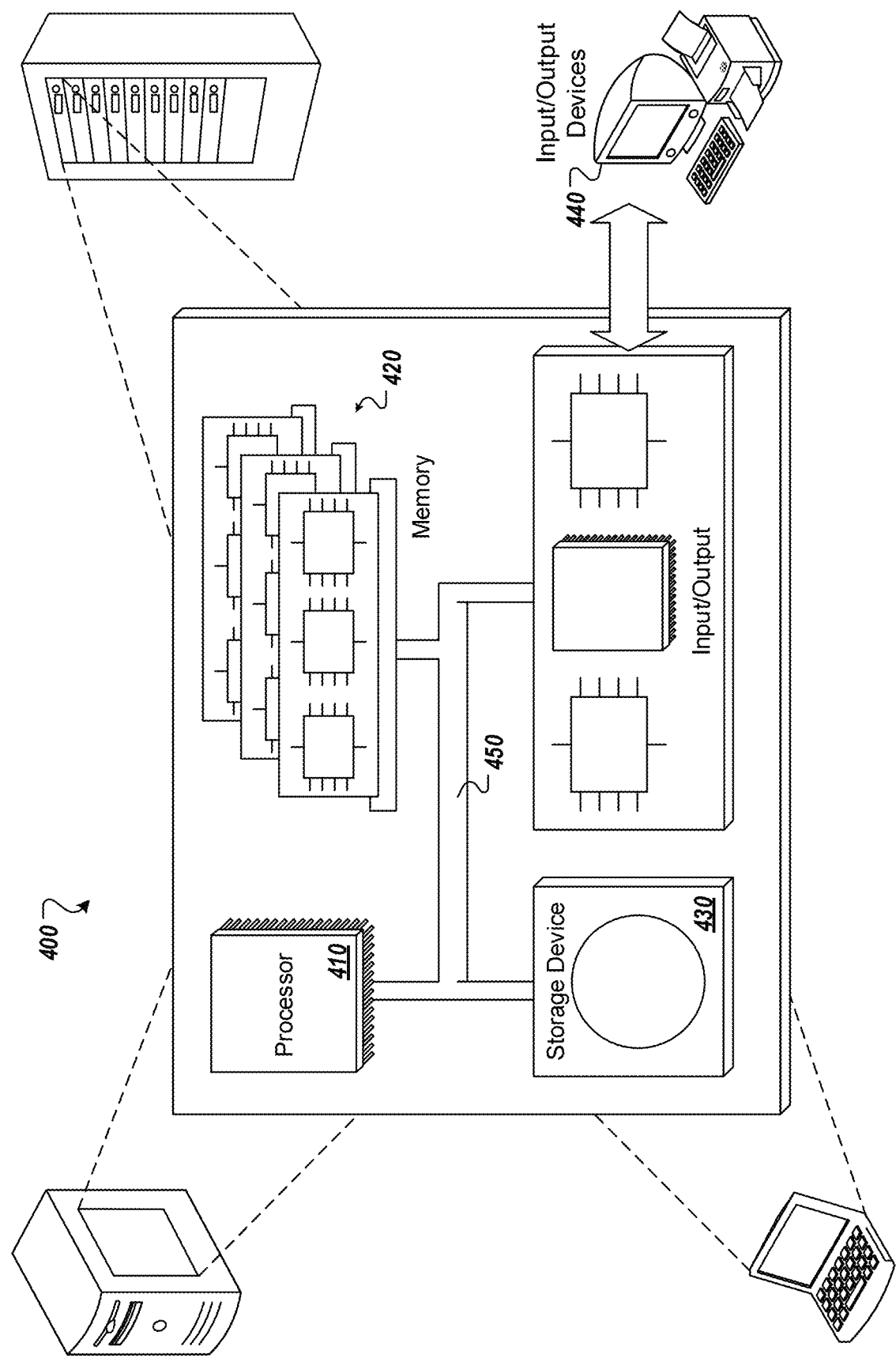
FIG. 4 depicts a block diagram illustrating a computing system, in accordance with some example implementations.

In some implementations, the current subject matter can be configured to be implemented in a system 400, as shown in FIG. 4. The system 400 can include a processor 410, a memory 420, a storage device 430, and an input/output device 440. Each of the components 410, 420, 430 and 440 can be interconnected using a system bus 450. The processor 410 can be configured to process instructions for execution within the system 400. In some implementations, the processor 410 can be a single-threaded processor. In alternate implementations, the processor 410 can be a multi-threaded processor. The processor 410 can be further configured to process instructions stored in the memory 420 or on the storage device 430, including receiving or sending information through the input/output device 440. The memory 420 can store information within the system 400. In some implementations, the memory 420 can be a computer-readable medium. In alternate implementations, the memory 420 can be a volatile memory unit. In yet some implementations, the memory 420 can be a non-volatile memory unit. The storage device 430 can be capable of providing mass storage for the system 400. In some implementations, the storage device 430 can be a computer-readable medium. In alternate implementations, the storage device 430 can be a floppy disk device, a hard disk device, an optical disk device, a tape device, non-volatile solid state memory, or any other type of storage device. The input/output device 440 can be configured to provide input/output operations for the system 400. In some implementations, the input/output device 440 can include a keyboard and/or pointing device. In alternate implementations, the input/output device 440 can include a display unit for displaying graphical user interfaces.

In some implementations, one or more application function libraries in the plurality of application function libraries can be stored in the one or more tables as binary large objects. Further, a structured query language can be used to query the storage location storing the application function library.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first background job from a second background job, but need not imply any chronological ordering or a fixed reference system (such that a first background job in one paragraph of the description can be different from a first background job in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more user device computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include user devices and servers. A user device and server are generally, but not exclusively, remote from each other and typically interact through a communication network. The relationship of user device and server arises by virtue of computer programs running on the respective computers and having a user device-server relationship to each other.

Further non-limiting aspects or embodiments are set forth in the following numbered examples:

Example 1: A computer-implemented method comprising: receiving, by one or more processors, a document comprising readable text; processing, by the one or more processors, the document to determine, from the readable text, a plurality of tokens; determining, by the one or more processors, pairs of vectors corresponding to the plurality of tokens, each pair of vectors comprising a query vector and a key vector; determining, by the one or more processors, attention scores for the plurality of tokens by using the pairs of vectors; normalizing, by the one or more processors, the attention scores to generate normalized attention scores; and identifying, by the one or more processors, connected tokens in the plurality of tokens using the normalized attention scores.

Example 2: The computer-implemented method of example 1, further comprising: transmitting, to a database, the connected tokens for storage, the database being accessible by the application for processing the connected tokens.

Example 3: The computer-implemented method of any one of the preceding examples, wherein the document is formatted as an image.

Example 4: The computer-implemented method of any one of the preceding examples, further comprising: processing the image, using an optical character recognition application, to generate the readable text.

Example 5: The computer-implemented method of any one of the preceding examples, wherein the readable text comprises keys and values.

Example 6: The computer-implemented method of any one of the preceding examples, wherein the vectors comprise key vectors and query vectors.

Example 7: The computer-implemented method of any one of the preceding examples, wherein the normalized attention scores comprise instance scores and key-value scores.

Example 8: A non-transitory computer-readable storage medium comprising programming code, which when executed by at least one data processor, causes operations comprising: receiving a document comprising readable text; processing the document to determine, from the readable text, a plurality of tokens; determining pairs of vectors corresponding to the plurality of tokens, each pair of vectors comprising a query vector and a key vector; determining attention scores for the plurality of tokens by using the pairs of vectors; normalizing the attention scores to generate normalized attention scores; and identifying connected tokens in the plurality of tokens using the normalized attention scores.

Example 9: The non-transitory computer-readable storage medium of example 8, wherein the operations further comprise: transmitting, to a database, the connected tokens for storage, the database being accessible by the application for processing the connected tokens.

Example 10: The non-transitory computer-readable storage medium of any one of the preceding examples, wherein the document is formatted as an image.

Example 11: The non-transitory computer-readable storage medium of any one of the preceding examples, wherein the operations further comprise: processing the image, using an optical character recognition application, to generate the readable text.

Example 12: The non-transitory computer-readable storage medium of any one of the preceding examples, wherein the readable text comprises keys and values.

Example 13: The non-transitory computer-readable storage medium of any one of the preceding examples, wherein the vectors comprise key vectors and query vectors.

Example 14: The non-transitory computer-readable storage medium of any one of the preceding examples, wherein the normalized attention scores comprise instance scores and key-value scores.

Example 15: A system comprising: at least one data processor; and at least one memory storing instructions, which when executed by the at least one data processor, cause operations comprising: receiving a document comprising readable text; processing the document to determine, from the readable text, a plurality of tokens; determining pairs of vectors corresponding to the plurality of tokens, each pair of vectors comprising a query vector and a key vector; determining attention scores for the plurality of tokens by using the pairs of vectors; normalizing the attention scores to generate normalized attention scores; and identifying connected tokens in the plurality of tokens using the normalized attention scores.

Example 16: The system of example 15, wherein the operations further comprise: transmitting, to a database, the connected tokens for storage, the database being accessible by the application for processing the connected tokens.

Example 17: The system of any one of the preceding examples, wherein the document is formatted as an image.

Example 18: The system of any one of the preceding examples, wherein the operations further comprise: processing the image, using an optical character recognition application, to generate the readable text, wherein the readable text comprises keys and values.

Example 19: The system of any one of the preceding examples, wherein the vectors comprise key vectors and query vectors.

Example 20: The system of any one of the preceding examples, wherein the normalized attention scores comprise instance scores and key-value scores.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method comprising:
    receiving, by one or more processors of a server system, a document comprising readable text;
    processing, by the one or more processors, the document to determine, from the readable text, a plurality of tokens;
    determining, by the one or more processors, pairs of vectors corresponding to the plurality of tokens, each pair of vectors comprising a query vector and a key vector;
    determining, by the one or more processors, attention scores for the plurality of tokens by using the pairs of vectors;
    normalizing, by the one or more processors, the attention scores to generate normalized attention scores;
    identifying, by the one or more processors, connected tokens in the plurality of tokens using the normalized attention scores; and
    causing, by the one or more processors, the connected tokens to be processed by an application configured to perform scanned document processing by providing the connected tokens as input to the application via the server system.

2. The computer-implemented method of claim 1, wherein the document is formatted as an image.

3. The computer-implemented method of claim 2, further comprising:
    processing the image, using an optical character recognition application, to generate the readable text.

4. The computer-implemented method of claim 3, wherein the readable text comprises keys and values.

5. The computer-implemented method of claim 1, wherein the vectors comprise key vectors and query vectors.

6. The computer-implemented method of claim 1, wherein the normalized attention scores are generated using 1) a first predictive model trained to predict links between words belonging to a same instance and configured to generate instance scores as output, and 2) a second predictive model trained to predict links between words belonging to a key-value pair and configured to generate key-value scores as output.

7. A non-transitory computer-readable storage medium comprising programming code, which when executed by at least one data processor of a server system, causes operations comprising:
    receiving a document comprising readable text;
    processing the document to determine, from the readable text, a plurality of tokens;
    determining pairs of vectors corresponding to the plurality of tokens, each pair of vectors comprising a query vector and a key vector;
    determining attention scores for the plurality of tokens by using the pairs of vectors;
    normalizing the attention scores to generate normalized attention scores;
    identifying connected tokens in the plurality of tokens using the normalized attention scores; and
    causing the connected tokens to be processed by an application configured to perform scanned document processing by providing the connected tokens as input to the application via the server system.

8. The non-transitory computer-readable storage medium of claim 7, wherein the document is formatted as an image.

9. The non-transitory computer-readable storage medium of claim 8, wherein the operations further comprise:
    processing the image, using an optical character recognition application, to generate the readable text.

10. The non-transitory computer-readable storage medium of claim 9, wherein the readable text comprises keys and values.

11. The non-transitory computer-readable storage medium of claim 7, wherein the vectors comprise key vectors and query vectors.

12. The non-transitory computer-readable storage medium of claim 7, wherein the normalized attention scores are generated using 1) a first predictive model trained to predict links between words belonging to a same instance and configured to generate instance scores as output, and 2) a second predictive model trained to predict links between words belonging to a key-value pair and configured to generate key-value scores as output.

13. A system comprising:
    at least one data processor of a server system; and
    at least one memory storing instructions, which when executed by the at least one data processor, cause operations comprising:
        receiving a document comprising readable text;
        processing the document to determine, from the readable text, a plurality of tokens;
        determining pairs of vectors corresponding to the plurality of tokens, each pair of vectors comprising a query vector and a key vector;
        determining attention scores for the plurality of tokens by using the pairs of vectors;
        normalizing the attention scores to generate normalized attention scores;
        identifying connected tokens in the plurality of tokens using the normalized attention scores; and causing the connected tokens to be processed by an application configured to perform scanned document processing by providing the connected tokens as input to the application via the server system.

14. The system of claim 13, wherein the document is formatted as an image.

15. The system of claim 14, wherein the operations further comprise:

processing the image, using an optical character recognition application, to generate the readable text, wherein the readable text comprises keys and values.

16. The system of claim 13, wherein the vectors comprise key vectors and query vectors.

17. The system of claim 13, wherein the normalized attention scores are generated using 1) a first predictive model trained to predict links between words belonging to a same instance and configured to generate instance scores as output, and 2) a second predictive model trained to predict links between words belonging to a key value pair and configured to generate key-value scores as output.

* * * * *